(No Model.)
H. N. F. SCHAEFFER.
BATTERY.
No. 535,464. Patented Mar. 12, 1895.
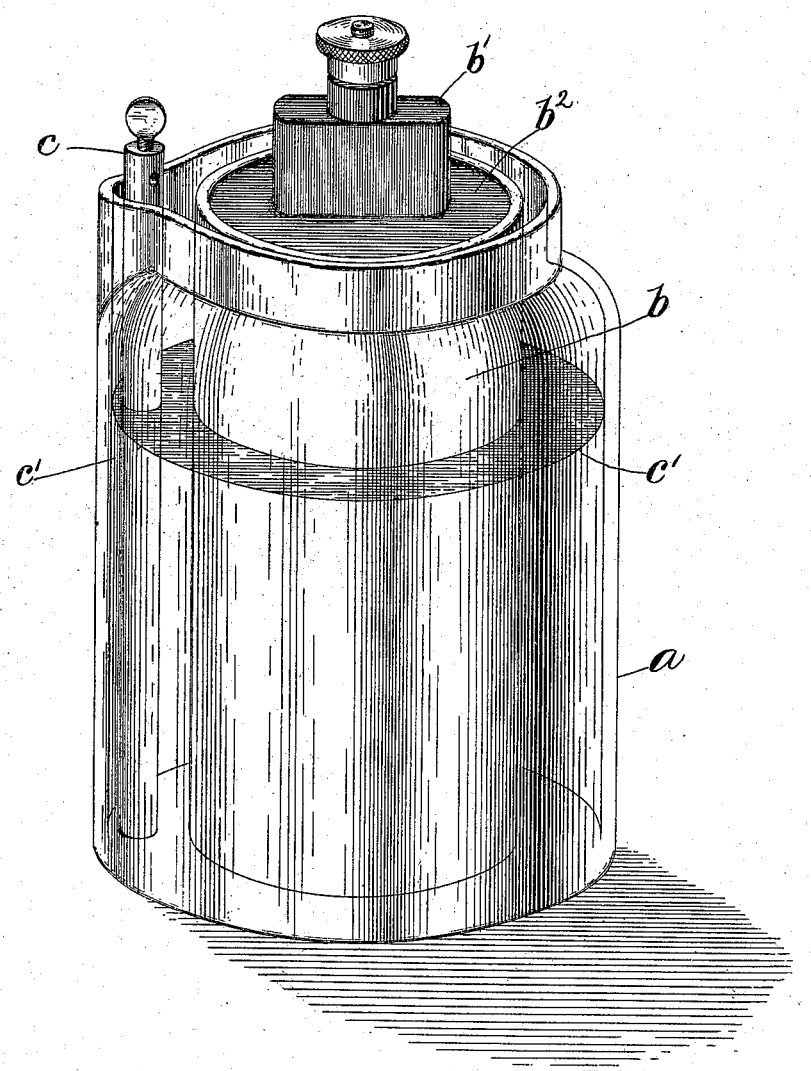
Witnesses.
John F. Nelson,
J. Murphy.
Inventor.
Henri N. F. Schaeffer
By Jas. H. Churchill
Atty.

UNITED STATES PATENT OFFICE.

HENRI N. F. SCHAEFFER, OF MANCHESTER, NEW HAMPSHIRE, ASSIGNOR TO GILBERT BROTHERS & CO., OF BOSTON, MASSACHUSETTS.

BATTERY.

SPECIFICATION forming part of Letters Patent No. 535,464, dated March 12, 1895.

Application filed January 9, 1893. Renewed January 31, 1895. Serial No. 536,879. (No model.)

*To all whom it may concern:*

Be it known that I, HENRI N. F. SCHAEFFER, of Belfort, Haut-Rhin, Germany, but now residing in Manchester, county of Hillsborough, and State of New Hampshire, have invented an Improvement in Batteries, of which the following description, in connection with the accompanying drawings, is a specification, like letters on the drawings representing like parts.

This invention relates to primary batteries of that class known as open circuit batteries, and is more particularly an improvement upon the well-known Leclanché battery. In the Leclanché battery as now commonly constructed, the electrolyte is composed of a solution of sal-ammoniac or ammonium chloride. One of the principal objections to the Leclanché battery is the creeping of the electrolyte, that is, the ammonium chloride crystallizes, and by capillary attraction creeps up the sides of the glass jar or vessel. This creeping action of the electrolyte is objectionable and very disagreeable as it requires substantially constant attention and, if allowed to proceed, soon exhausts the battery. Efforts have been made to retard the creeping action of the sal-ammoniac electrolyte by covering the edges of the jar or vessel with paraffine or like waxy substance, but experience has demonstrated that the use of paraffine is only partially successful, for after a short time, the salt creeps over the paraffine. As now constructed and known to me, Leclanché batteries are not provided with covers, owing to the fact, that the bottom or under side of the cover would soon become coated with the salt of ammonium chloride, which would short circuit the battery by establishing a connection between the positive and negative poles of the battery. Furthermore, batteries employing sal-ammoniac as the electrolyte run down in a very short time if placed in a closed circuit.

In accordance with my invention, I have discovered and practically demonstrated that lactic acid and its soluble salts possess properties which render it peculiarly adapted for use as an electrolyte for primary batteries, owing to the fact, that dilute lactic acid or dilute solutions of lactic acid salts or lactarts, do not crystallize and hence will not creep, and also that a primary battery having, as its electrolyte, lactic acid or a soluble salt thereof, gives a substantially high voltage, and that the said battery may be run on a closed circuit without substantial depreciation in its voltage for a substantially long time as compared with the Leclanché or like open circuit batteries. I have also ascertained by experiment and practical demonstration, that the ampère strength of a battery using lactic acid or solutions of lactarts as its electrolyte, may be considerably increased by adding to the lactic acid, a mineral acid or a salt of a mineral acid, such as hydro-chloric, and in practice a very efficient electrolyte may be made by the use of sal-ammoniac and lactic acid.

In order that my invention may be more readily comprehended, I will specifically describe the manner of preparing a lactic electrolytic solution preferred by me as suitable for obtaining a substantially high voltage and substantially large ampére strength.

In accordance with my invention, one hundred cubic centimeters of lactic acid 35° Baumé has dissolved in it one hundred grams of chloride of ammonia or sal-ammoniac, which forms, as I believe, a double acid salt. Water is then added, and for the best results, I prefer to add a small quantity of an antiseptic, such as arsenic acid, bi-chloride of mercury, &c., to guard against the action upon the lactic acid of germs or ferments in the air. Sufficient water is then added to make five hundred cubic centimeters of the electrolytic solution. The lactic electrolyte, thus formed, may be used in a battery such as shown in the drawings, which represents a battery constructed in the manner of the well-known Leclanché battery, and in which $a$ represents the outer jar or vessel; $b$, the porous cup containing the carbon element $b'$ and the black oxide of manganese $b^2$; $c$, the zinc element or electrode; and $c'$ the lactic electrolytic solution.

The battery represented in the drawings is free from the creeping effect of the electrolyte and consequently can be used for a long time without renewal of the electrolyte and without care or watching on the part of the operator. It possesses a substantially high voltage and substantially large ampère strength, and can be run on a closed circuit for a long time with no appreciable decrease in voltage as compared with the ordinary open circuit batteries, such as the Leclanché, and if desired, can be covered without danger of short circuiting.

In my improved battery, the electrolytic solution remains perfectly clear and the internal resistance is low, and consequently, there is no appreciable consumption of the zinc electrode, and this electrode may be used for a substantially long time without renewal. Furthermore, the lactic electrolyte can also be used with other forms of batteries, having carbon and zinc electrodes, such as the Law, Little Giant, &c.

I do not desire to limit myself to the exact ingredients or the exact proportions herein mentioned as the same may be varied, the gist of my invention residing in the lactic electrolyte, and while I prefer to form the double acid salt, as above described, I do not desire to limit my invention in this respect, as the electrolytic solution may be effected in other ways, as for instance, one hundred cubic centimeters lactic acid 35° Baumé are mixed with one hundred cubic centimeters of an alkaline hydrate, as for instance, ammonium hydrate, and to this solution is added a dilute solution of commercial hydro-chloric acid composed of fifty cubic centimeters water and fifty cubic centimeters acid. Additional water is then added to make up five hundred cubic centimeters.

I claim—

1. The herein described battery having its electrolyte composed in whole or in part of lactic acid or a soluble salt thereof, substantially as described.

2. The herein described battery having its electrolyte composed of a salt of lactic acid and a mineral acid, substantially as described.

3. The herein described electrolyte for batteries consisting of a mixture of lactic acid, a mineral acid, and an alkali, substantially as described.

4. The herein described electrolyte for batteries consisting of a mixture of lactic acid, a mineral acid, an alkali and an antiseptic, substantially as described.

In testimony whereof I have signed my name to this specification in the presence of two subscribing witnesses.

HENRI N. F. SCHAEFFER.

Witnesses:
JAS. H. CHURCHILL,
J. MURPHY.